United States Patent
Ida

(10) Patent No.: US 10,295,381 B2
(45) Date of Patent: May 21, 2019

(54) INDICATOR

(71) Applicant: TEAC Corporation, Tokyo (JP)

(72) Inventor: Kazuki Ida, Tokyo (JP)

(73) Assignee: TEAC CORPORATION, Tokyo (JP)

( * ) Notice: Subject to any disclaimer, the term of this patent is extended or adjusted under 35 U.S.C. 154(b) by 230 days.

(21) Appl. No.: 14/808,739

(22) Filed: Jul. 24, 2015

(65) Prior Publication Data

US 2016/0025526 A1   Jan. 28, 2016

(30) Foreign Application Priority Data

Jul. 28, 2014 (JP) .................................. 2014-153058

(51) Int. Cl.
*G01D 11/28* (2006.01)
*F21V 8/00* (2006.01)

(52) U.S. Cl.
CPC ............ *G01D 11/28* (2013.01); *G02B 6/0001* (2013.01)

(58) Field of Classification Search
CPC ........ G01D 11/26; G01D 13/00; G01D 11/28; B60Q 3/14; G02B 6/0001; G02B 6/0021
See application file for complete search history.

(56) References Cited

U.S. PATENT DOCUMENTS

| 4,370,532 A * | 1/1983 | Green | H01H 9/162 |
| | | | 200/314 |
| 2004/0136682 A1 * | 7/2004 | Watanabe | G02B 6/0068 |
| | | | 385/146 |
| 2007/0115684 A1 * | 5/2007 | Bui | G02B 6/0001 |
| | | | 362/558 |
| 2008/0151539 A1 | 6/2008 | Lee et al. | |
| 2010/0080014 A1 * | 4/2010 | Ichikawa | B60Q 3/51 |
| | | | 362/546 |

FOREIGN PATENT DOCUMENTS

| CN | 201225565 Y | 4/2009 |
| CN | 201502926 U | 6/2010 |
| CN | 103839491 A | 6/2014 |
| CN | 203718517 U | 7/2014 |
| EP | 0 545 052 A2 | 6/1993 |
| JP | 6-36162 U | 5/1994 |
| JP | 2002-40969 A | 2/2002 |

(Continued)

*Primary Examiner* — Karabi Guharay
*Assistant Examiner* — Nathaniel J Lee
(74) *Attorney, Agent, or Firm* — Seed IP Law Group LLP

(57) ABSTRACT

An indicator has an optical member including a protuberance formed on a front side and an indentation formed on a back side of the optical member in which the indentation is smaller than the protuberance in terms of a projection area and in which the front-side protuberance fits into the opening in a front face of the housing; and an LED light source disposed opposite the back-side indentation of the optical member. A center axis of the front-side protuberance and a center axis of the backs-side indentation are in line with an optical axis of the LED light source. Light originating from the LED light source passes through the back-side indentation and the front-side protuberance, exiting from the opening in the front face of the housing. Thereby, only the center of the rectangular opening looks lighting up brightly, rectangularly.

3 Claims, 5 Drawing Sheets

(56) References Cited

FOREIGN PATENT DOCUMENTS

| | | |
|---|---|---|
| JP | 2002-257603 A | 9/2002 |
| JP | 2010-83210 A | 4/2010 |
| JP | 2011-60706 A | 3/2011 |
| JP | 2011-119165 A | 6/2011 |
| TW | M304796 U | 1/2007 |
| TW | 200829123 A | 7/2008 |
| TW | 200917279 A | 4/2009 |

* cited by examiner

INDICATOR

PRIORITY INFORMATION

This application claims priority to Japanese Patent Application No. 2014-153058 filed on Jul. 28, 2014, which is incorporated herein by reference in its entirety.

BACKGROUND OF THE INVENTION

Technical Field

The present invention relates to an indicator and, more particularly, to an indicator using a light-emitting diode (LED) as a light source.

Related Art

Various electric appliances have hitherto been equipped with indicators using LEDs as light sources. The indicator has been required to be superior in design, particularly in recent years, in view of an emphasis on design as well as to enable the user to be able to clearly view lighting/extinction. JP 2011-60706 A relates to a liquid-crystal display device and describes lighting equipment including: an LED light source; a light-shielding barrier; and a lens-shaped structure which is disposed on the barrier to cover a light-emitting region partitioned by the barrier. The lens-shaped structure is stated as being a pyramidal lens which has a curved slope and a bottom surface identical in shape with an opening of the light-emitting region and which projects toward a LED substrate. The lens-shaped structure changes an advancing direction of the light, which originates from the light source and enters the lens-shaped structure, such that an angle between the advancing direction and the direction of the normal to an LED substrate becomes smaller. This makes it possible to inhibit the halo effect, which would otherwise arise from a boundary between a bright area and a dark area in an image.

In the related art, the halo effect is prevented by uniformly illuminating the opening of a light-emitting region. However, in the related-art, no consideration is paid to local illumination of a portion of the opening of the light-emitting region. For instance, it is possible to make a feature of an advanced design manifest by giving a specific shape; for instance, a rectangular shape, to the opening of the lighting-emitting region and locally illuminating only a center portion of the opening. Such a consideration is also not taken into account. In the related art, the lens-shaped structure assumes a pyramidal shape and complicate in which the slope of the structure is a curve and in which the bottom surface of the same is identical in shape with the opening of the light-emitting region. An indicator with a superior design is desired to be obtained in a simpler configuration.

The present invention provides an indicator with a characteristic of superior design in simple configuration and at suppressed cost increase.

SUMMARY

The present invention provides an indicator with an advanced indicator in a simple structure while an increase in cost is inhibited.

An indicator of the present invention includes an optical member including a protuberance formed on a front side and an indentation, which is smaller than the protuberance in terms of a projection area, formed on a back side in which the front-side protuberance fits into the opening in a front face of a housing; and an LED light source disposed opposite the back-side indentation of the optical member, wherein a center axis of the front-side protuberance and a center axis of the back-side indentation are in line with an optical axis of the LED light source; and wherein light originating from the LED light source passes through the back-side indentation and the front-side protuberance, exiting from the opening in the front face of the housing.

Further, another indicator of the present invention includes an optical member including a protuberance formed on a front side and another protuberance, which is smaller than the protuberance in terms of a projection area, formed on a back side in which the front-side protuberance fits into the opening in a front face of the housing; and an LED light source disposed opposite the back-side indentation of the optical member, wherein a center axis of the front-side protuberance and a center axis of the back-side protuberance are in line with an optical axis of the LED light source; and wherein light originating from the LED light source passes through the back-side protuberance and the front-side protuberance, exiting from the opening in the front face of the housing.

In one embodiment of the present invention, the optical member assumes a bridge structure including at least two legs; and wherein the front-side protuberance is formed on each of the legs, and the front-side protuberances fit into each of the corresponding juxtaposed openings in the front face of the housing.

In another embodiment of the present invention, the opening, the front-side protuberance, and the back-side indentation assume a rectangular, planar shape.

According to the present invention, an indicator with an advanced design can be provided in a simple structure while an increase in cost is inhibited.

The invention will be more clearly comprehended by reference to embodiments provided below. However, the embodiments provided below are illustrative, and the scope of the invention is not limited to the embodiments.

BRIEF DESCRIPTION OF THE DRAWINGS

Preferred embodiments of the present invention will be described in detail by reference to the following drawings, wherein.

DETAILED DESCRIPTION

First Embodiment

Figure 1:
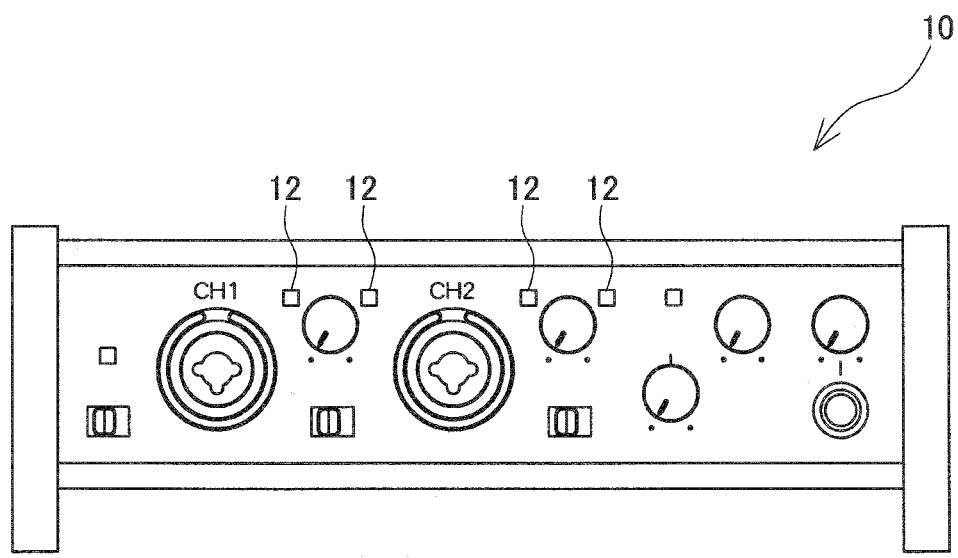
FIG. 1 is a front view of an audio interface of embodiments.

FIG. 1 is a front view of an audio interface which is an example electric appliance equipped with an indicator of a first embodiment. The audio interface has a plurality of input terminals and a plurality of output terminals. An audio signal originating from a sound source is input to the audio interface, where the signal is converted into a digital signal, and output to a personal computer, and the like. Further, the audio signal originating from the sound source is input to the audio interface, and the signal is output after being amplified.

In addition to a plurality of input terminals (a channel 1 and a channel 2 in the drawing), a changeover switch, and control volumes, indicators 12 for indicating various operating conditions are on a front face of the audio interface 10.

Each of the indicators 12 assumes a rectangular outer shape. Rectangular openings are formed in predetermined locations on the front face of a housing (a front panel) of an audio interface 10, and an optical member is fitted into each of the openings. LED light sources are disposed behind the optical members, respectively. Light originating from the LED light source exits from the opening of the front face of the housing by way of the optical member. An indicator showing a specific operating state performs operation by activating or deactivating the LED light source. The LED light source is electrically connected to a circuit board and activated or deactivated by a drive signal from a controller implemented on the circuit board. An example of the indicator 12 is a signal input indicator. When a signal is input from an input terminal, the LED light source lights up (ON), thereby illuminating the indicator 12. As a matter of course, the indicator 12 is of arbitrary type and not limited to the signal input indicator.

Figure 2:
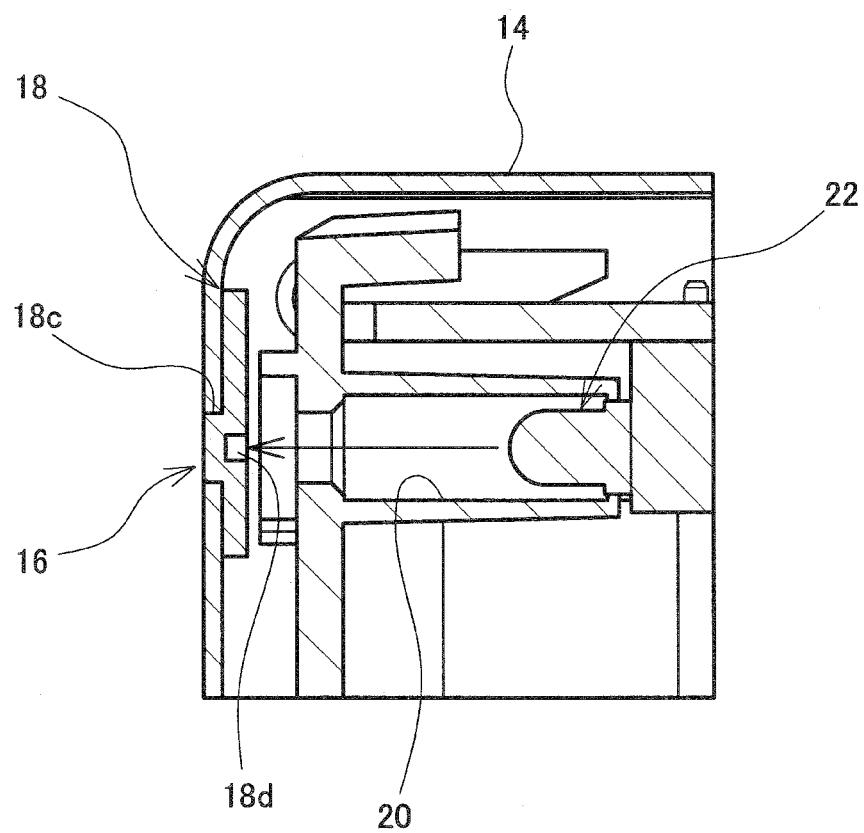
FIG. 2 is a fragmentary cross-sectional view of a neighborhood of the indicator.

FIG. 2 is a fragmentary enlarged view of a neighborhood of the indicator 12 in the longitudinal cross-sectional view of the audio interface 10.

Rectangular openings 16 are formed in a portion of the front panel 14 of the audio interface 10. A protuberance 18c formed on a front side of an optical member 18 fits into each of the rectangular openings 16. In short, the opening 16 and the protuberance 18c on the front side of the opening member 18 are in agreement with each other in terms of a shape. The optical members 18 are positioned on the front panel 14 such that the openings 16 and the corresponding protuberances 18c mutually face each other. Further, the protuberances 18c are fitted into the corresponding openings 16, thereby attaching the optical members 18 to the front panel 14. The optical members 18 act as lenses for guiding light from the LED light sources 22 and are made of ABS resin, and others, which is transparent or translucent to light from the LED light source 22.

The LED light source 22 is disposed behind each of the optical members 18, and a cylindrical cavity 20 is formed between the LED light source 22 and the corresponding optical member 18. Light exiting from the LED light source 22 enters the optical member 18 by way of the cavity 20, and the optical member 18 modulates the quantity of light. The thus-modulated light exits from the opening 16. "Modulation of light quantity" used herein refers to causing a difference in quantity of light incident on the optical member 18. More specifically, the quantity of light incident on a center region of the opening 16 is made relatively larger than the quantity of light incident on surroundings of the center. The modulation of light quantity is realized by the protuberance 18c and an indentation formed on a back side of the optical member 18.

Figure 3A:
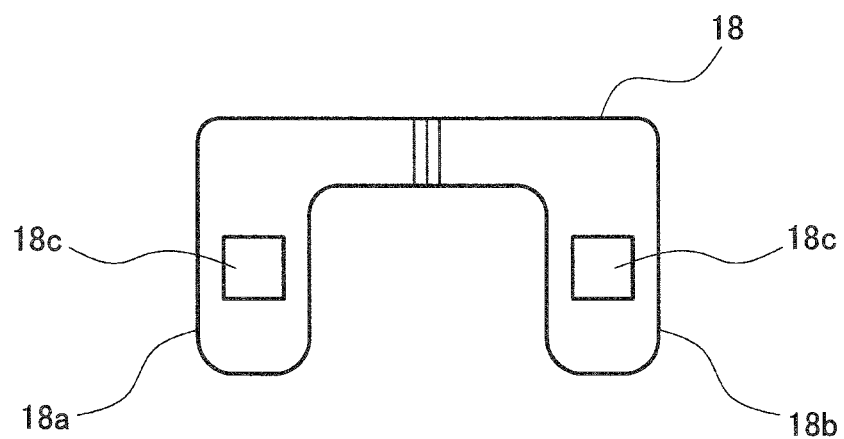
FIG. 3A is a front view of an optical member.
Figure 3B:
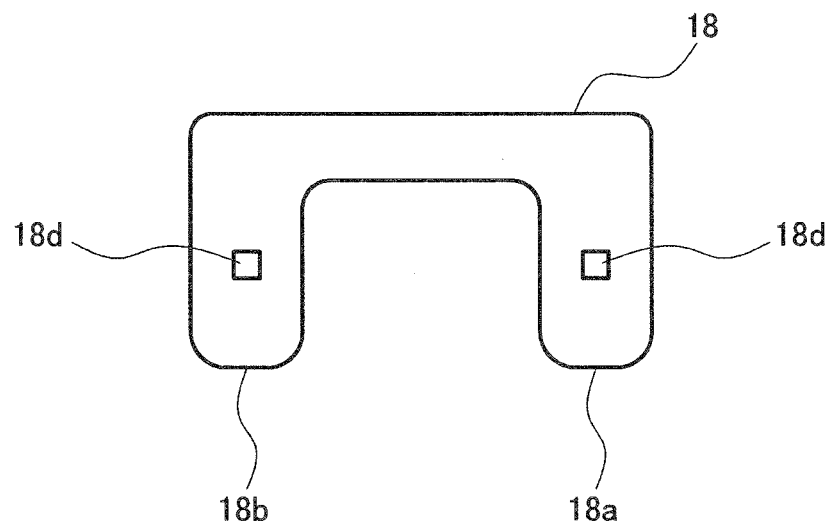
FIG. 3B is a rear view of the optical member.

FIG. 3A is a front view of the optical member 18, and FIG. 3B is a rear view of the optical member 18. The optical member 18 is common between the two juxtaposed indicators 12. Specifically, the optical member 18 assumes a bridge structure consisting of two legs 18a and 18b. One of the two juxtaposed indicators 12 corresponds to one leg 18a, whilst the remaining indicator corresponds to the leg 18b. For instance, when the two juxtaposed indicators are assigned respectively to a signal input (SIG) and a peak (PEAK), the leg 18a corresponds to the signal input indicator 12, and the leg 18b corresponds to the peak indicator 12. The LED light sources 22 are also provided in correspondence with the legs 18a and 18b, respectively.

The rectangular protuberance 18c is formed on a front side of each of the legs 18a and 18b, and the protuberances 18c fit into the respective rectangular openings 16 in the front panel 14. The center axis of the opening 16 and the center axis of the corresponding protuberance 18c are in line with an optical axis of the LED light source 22.

Meanwhile, a rectangular indentation 18d is formed on a back side of each of the legs 18a and 18b. A projection area of the indentation 18d is smaller than a projection area of the indentation 18c. "Projection area" used herein means areas obtained when the protuberance 18d is viewed from the front and the back as well as areas obtained when the protuberance 18c is viewed from the front and the back. The center axis of the indentation 18d is in line with the optical axis of the LED light source 22. Accordingly, the center axis of the protuberance 18c and the center axis of the indentation 18d, which are formed on the leg 18a, are in line with the optical axis of the LED light source 22a. The center axis of the protuberance 18c and the center axis of the indentation 18d, which are formed on the leg 18b, are in line with the optical axis of the LED light source 22b.

Figure 4A:
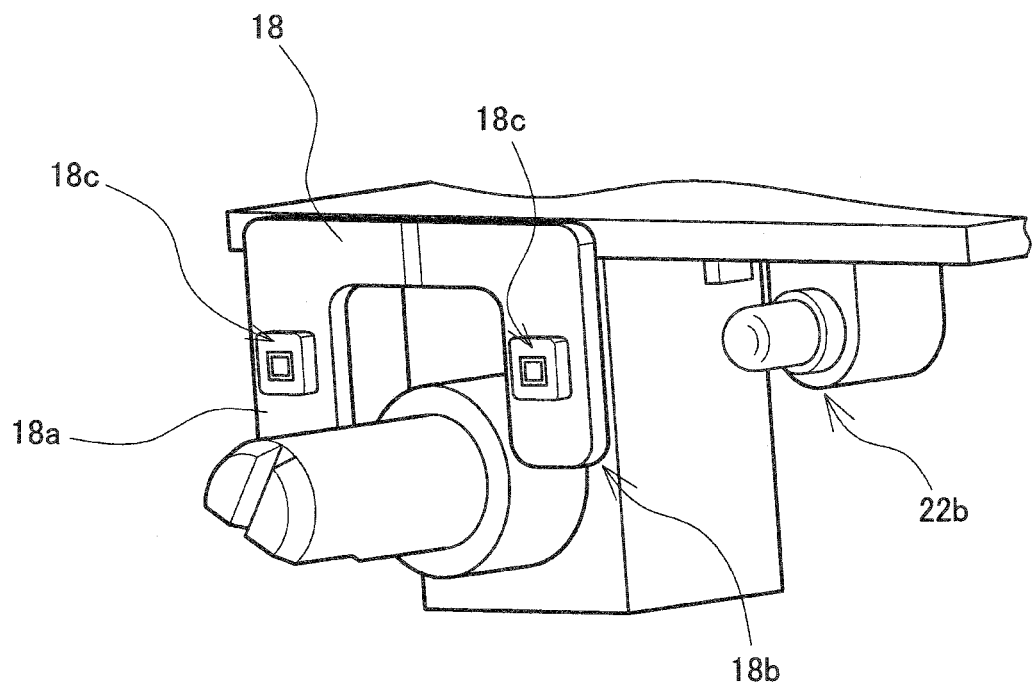
FIG. 4A is a perspective view of a LED light source and the optical member.
Figure 4B:
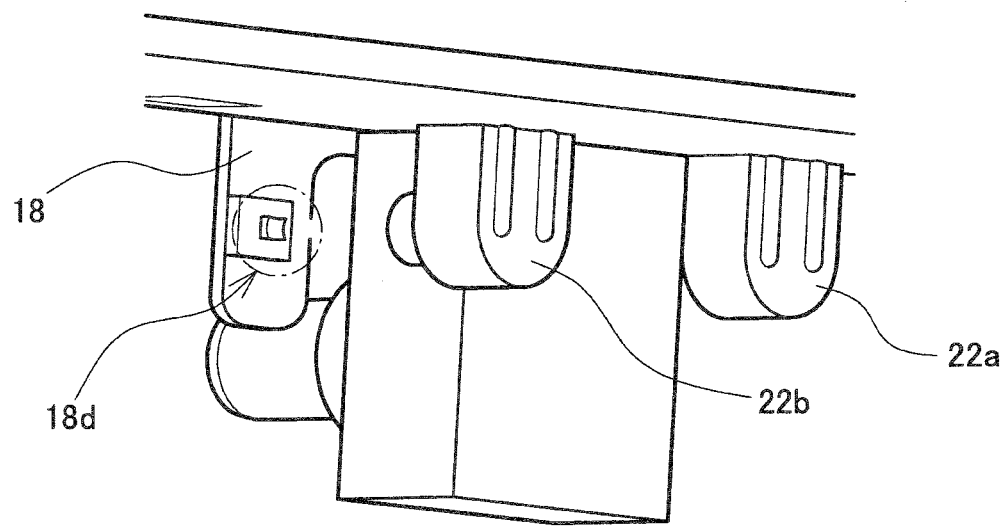
FIG. 4B is a perspective view of the LED light source and the optical member.

FIG. 4A and FIG. 4B are perspective views showing a layout of the LED light source 22 and the optical member 18. FIG. 4A is a perspective view achieved when the members are viewed from the front, and FIG. 4B is a perspective view achieved when the members are viewed from the back. As mentioned above, the LED light sources 22 are placed in correspondence with the respective legs 18a and 18b of the optical member 18 (the LED light sources are herein referred to as a LED light source 22a and a LED light source 22b). Light exiting from the light source 22a enters the backs-side indentation 18d of the leg 18a, exiting from the front-side protuberance 18c of the leg 18a and thereupon illuminating the indicator 12. Likewise, light exiting from the LED light source 22b enters the back-side indentation 18d, exiting from the front-side protuberance 18c of the leg 18b and thereupon illuminating another indicator 12.

Attention is now be paid to the leg 18a. Light exiting from the LED light source 22a passes through the cavity 20, entering the indentation 18d of the leg 18a of the optical member 18 and surroundings thereof. As illustrated in the cross-sectional view of FIG. 2, the region where the indentation 18d is formed is thinner than surroundings thereof in terms of the thickness of the optical member 18. Therefore, an optical distance is reduced accordingly, so that the quantity of transmitting light relatively increases correspondingly. Further, the surroundings of the indentation 18d are relatively thicker in terms of the thickness of the optical member 18. The optical distance accordingly increases, and the quantity of transmitting light relatively decreases correspondingly. Specifically, even when the optical member 18 is made of a transparent resin, the light is absorbed to some extent while passing through the optical member 18. Hence, a difference arises in the quantity of transmitting light according to the optical distance. Accordingly, when the indicator 12 is viewed from the front, the center of the indicator 12; in other words, the rectangular region where the indentation 18d is formed, looks bright. Surroundings of the center look dark. Since the opening 16 of the indicator 12 is rectangular, the rectangular light source comes to be distinctively visible in the rectangular indicator 12.

Figure 5:
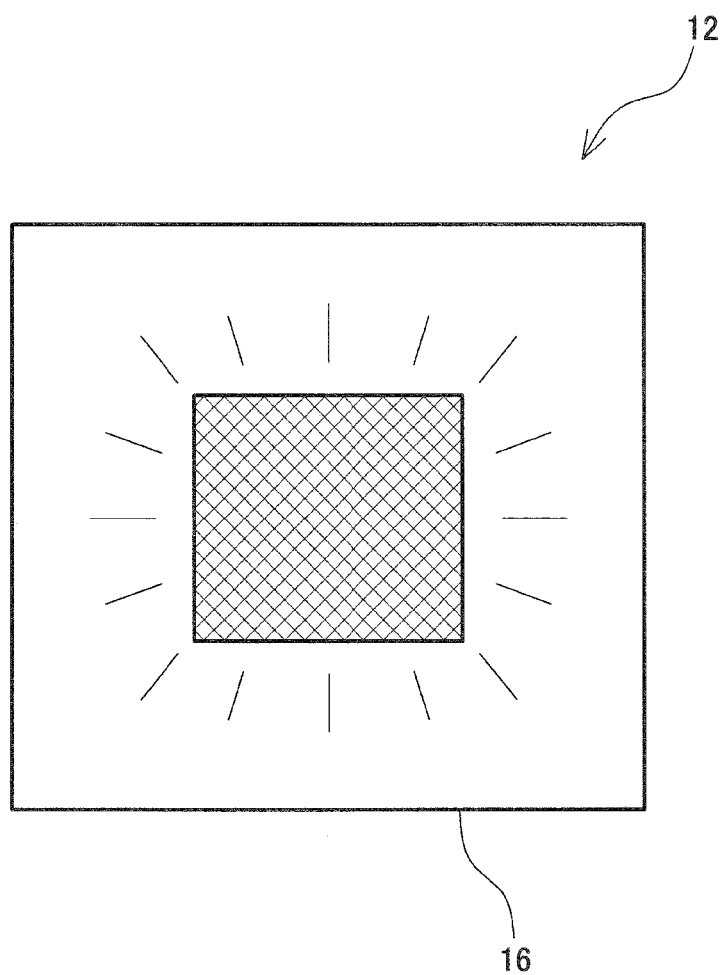
FIG. 5 is a front view of the indicator.

FIG. 5 shows the indicator 12 viewed from the front. The rectangular region looks bright in the center of the rectangular opening 16. An ordinary indicator is configured so as to cause the entirety of the rectangular opening 16 to light up uniformly (to effect surface emission). In the present embodiment; however, it should be noted that the center of the rectangular opening 16 be caused to light up locally, rectangularly on purpose.

As above, in the present embodiment, by virtue of the optical member 18 with the front-side protuberance 18c and the back-side indentation 18d, the indicator 12 of simple structure having a superior design which enables the light source to look in the center of the indicator 12 can be provided.

Second Embodiment

In the first embodiment, the protuberance 18c is formed on a front side of the optical member 18, and the indentation 18d is formed a back side the same, thereby causing a difference in light quantity. However, the difference in light quantity may also be formed by forming the protuberance 18c on the front side of the optical member 18 and another protuberance on the back side of the same, too.

Figure 6:
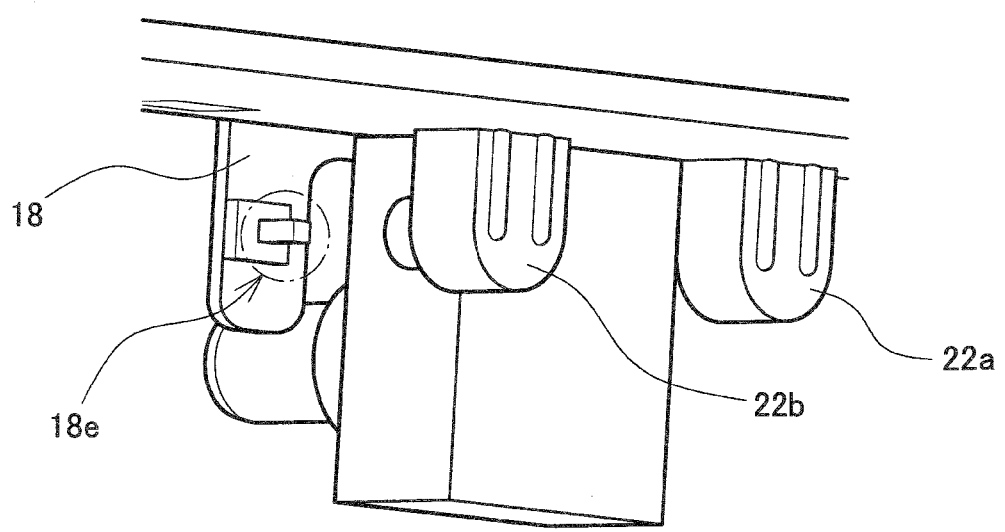
FIG. 6 is a LED light source and an optical member of another embodiment.

FIG. 6 is a perspective view which illustrates a layout of the LED light source 22 and the optical member 18 in the present embodiment when viewed from the back. The perspective view of them achieved when viewed from the front is identical with FIG. 4A.

The LED light source 22a and the LED light source 22b are provided in correspondence with the legs 18a and 18b of the optical member 18, respectively. Light exiting from the LED light source 22a enters the back-side protuberance 18e of the leg 18a, exiting from the protuberance 18c on the front of the leg 18a and thereupon illuminating the indicator 12. Likewise, light exiting from the LED light source 22b enters the back-side protuberance 18e of the leg 18b, exiting from the front-side protuberance 18c of the leg 18b and thereupon illuminating another indicator 12. The back-side protuberance 18e assumes the same rectangular shape as does the indentation 18d. A projection area of the protuberance 18e is smaller than that of the protuberance 18c disposed on the front. The center axis of the protuberance 18c and the center axis of the protuberance 18e, both protuberances being formed on the leg 18a, are in line with an optical axis of the LED light source 22a. The center axis of the protuberance 18c and the center axis of the protuberance 18e, both protuberances being formed on the leg 18b, are in line with an optical axis of the LED light source 22b.

Attention is now paid to the leg 18a. Light exiting from the LED light source 22, through the cavity 20, enters the protuberance 18e of the leg 18a of the optical member 18 and surroundings thereof. Since a distance between the LED light source 22 and the protuberance 18e is shorter than a distance between the LED light source 22 and surroundings of the protuberance 18e, light originating from the LED light source 22 enters the protuberance 18e without experiencing dispersion, and the protuberance 18e acts as a light guide, thereby guiding the light to the front. On the other hand, the light incident on the surroundings of the protuberance 18e already becomes dispersed. Hence, the quantity of dispersed light is relatively smaller than the quantity of the light incident on the protuberance 18e (the quantity of light decreases inversely, proportionally to a square of a distance from the LED light source 22). Accordingly, when viewed from the front, the center of the indicator 12; that is, the rectangular region where the protuberance 18e is formed, looks bright. In contrast, the surroundings of the center look dark. Since the opening 16 of the indicator 12 is rectangular, the rectangular light source comes to be visible in the rectangular indicator 12 (see FIG. 5).

Incidentally, it may also be possible to cause only the center region of the indicator 12 corresponding to the protuberance 18e light up by supporting the surroundings of the protuberance with a support made of an opaque member and thereby protecting and positioning the protuberance 18e and, moreover, by making a difference in light quantity between the light incident on the protuberance 18e and other light rays more clearly.

Figure 7A:
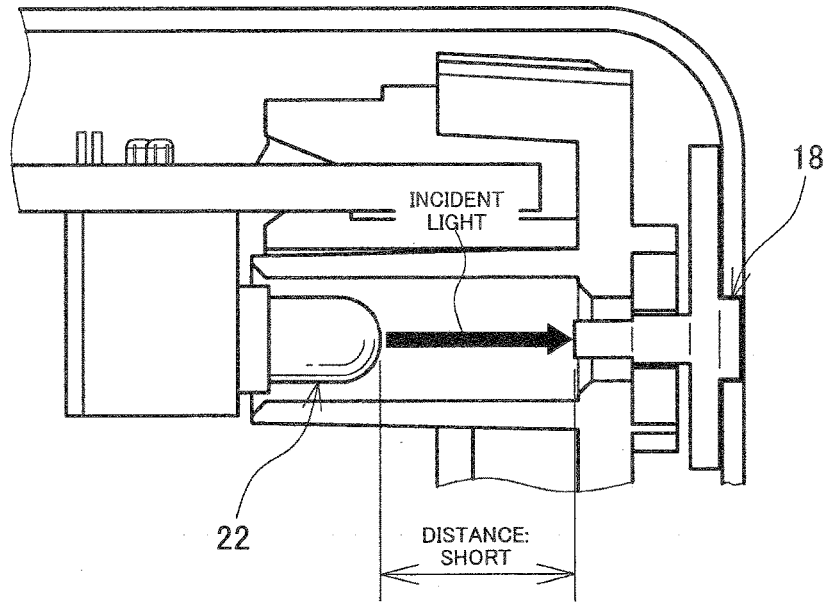
FIG. 7A is a cross-sectional view of the second embodiment.
Figure 7B:
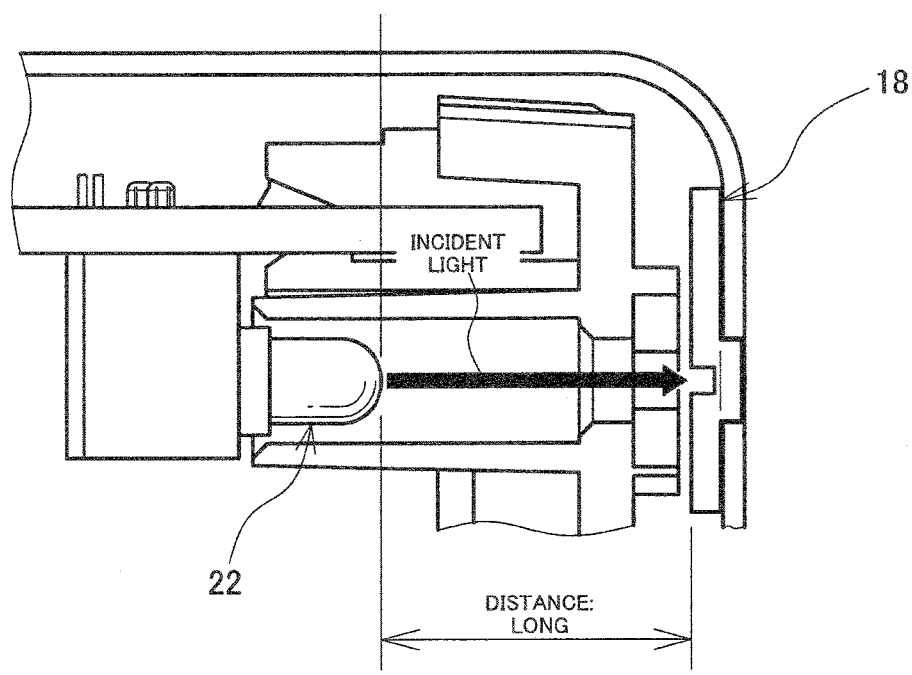
FIG. 7B is a cross-sectional view of the first embodiment.

FIG. 7A and FIG. 7B are cross-sectional views showing, in contrast with each other, the layout of the first embodiment in which the indentation 18d is formed on the back side of the optical member 18 and the layout of the second embodiment in which the protuberance 18e is formed. FIG. 7A is a cross-sectional view of the second embodiment, and FIG. 7B is a cross-sectional view of the first embodiment.

As in the case of the first embodiment, even in the second embodiment, the protuberance 18c on the front side of the optical member 18 fits into the opening 16 of the housing, whereby the optical member 18 is fixedly supported and positioned. The backs-side protuberance 18e of the optical member 18 is formed projectingly toward the LED light source 22 through an interior of the cavity 20. The center axis of the protuberance 18e is in line with the optical axis of the LED light source 22.

As to the distance between the LED light source 22 and the optical member 18, the distance between the LED light source 22 and the backs-side indentation 18d of the optical member 18 is relatively long in the first embodiment. In contrast, the distance between the LED light source 22 and the back-side protuberance 18e of the optical member 18 is relatively short in the second embodiment.

The first embodiment and the second embodiment differ from each other in terms of the principle of causing a difference in light quantity between the center and surroundings of the rectangular opening 16. Attention is paid to the followings. Namely, in the first embodiment, the difference in light quantity is caused by a difference in thickness of the optical member 18. In the second embodiment, the difference in light quantity is caused by a difference in distance from the LED light source 22 (although a difference in light quantity arises from a difference in thickness of the optical member 18, the difference in light quantity caused by the difference in distance is larger and hence becomes distinctive as a difference in light quantity).

As above, the embodiments of the present invention have been described thus far. However, the present invention is not limited to the embodiments and susceptible to various modifications.

For instance, in the first embodiment, the outer shape of the backs-side indentation 18d of the optical member 18 is rectangular but may also be circular or elliptic. In this case, a circular or elliptical region looks brightly lighting up in the center of the rectangular opening 16. The same also applies to the second embodiment, and the outer shape of the back-side protuberance 18e of the optical member 18 may also be circular or elliptic. The purport of the present invention is to cause a difference in quantity of light (brightness and darkness) originating from the LED light source by forming a step in the shape of the optical member 18, thereby making the LED light source 22 distinctive. An arbitrary shape may also be adopted within this scope.

However, it is desirable for a specific electric appliance to assume a specific shape, as illustrated specifically in FIG. 5, a mode of causing only the center of the rectangular opening 16 to light up rectangularly, in view of a design.

By the way, in order to illuminate only the center of the rectangular opening 16, there is also another conceivable way to cause the LED light source 22 to project as-is from the center of the opening 16. However, this way needs to fit the LED light source 22 itself into the housing, which raises a problem in manufacture from the viewpoint of protection and positioning of the LED light source 22. In the present embodiment, protection and positioning of the LED light source 22 are facilitated by fitting the optical member 18 into the rectangular opening 16, thereby yielding an effect of superior mass-production.

Moreover, the present embodiments have been described by taking, as an example, the optical member 18 having the two legs. However, as a matter of course, only one leg is suffice, and the present invention is also applicable to an optical member having three or four interconnected legs.

The present embodiments illustrate an audio interface as the example of an electric appliance. Needless to say, the present invention is not limited the audio interface and applicable to arbitrary electric appliances having indicators.

What is claimed is:

1. An indicator comprising:
    an optical member including a protuberance formed on a front side and an indentation, which is smaller than the protuberance in terms of a projection area, formed on a back side, the front-side protuberance being configured to fit into an opening in a front face of a housing; and
    a light emitting diode (LED) light source disposed behind the optical member opposite the back-side indentation of the optical member, wherein:
        the LED light source is disposed outside of the indentation formed on the back side of the optical member;
        a center axis of the front-side protuberance and a center axis of the back-side indentation are in line with an optical axis of the LED light source;
        light originating from the LED light source passes through the back-side indentation and the front-side protuberance, exiting from the opening in the front face of the housing; and
        a quantity of the light originating from the LED light source that exits a first region of the protuberance that is opposite the indentation is larger than a quantity of the light originating from the LED light source that exits a second region of the protuberance that is not opposite the indentation surrounding of the first region.

2. The indicator according to claim 1, wherein the optical member assumes a bridge structure including at least two legs; and wherein the front-side protuberance and the back-side indentation are formed on each of the legs, and the front-side protuberances fit into each of the corresponding juxtaposed openings in the front face of the housing.

3. The indicator according to claim 1, wherein the opening, the front-side protuberance, and the back-side indentation assume a rectangular, planar shape.

* * * * *